JESSE L. VINT, JR.
DARRELL G. WORTMAN
INVENTORS

United States Patent Office 3,488,570
Patented Jan. 6, 1970

3,488,570
COMBINED DYNAMIC AND FRICTION BRAKING
Jesse L. Vint, Jr., and Darrell G. Wortman, Tulsa, Okla., assignors to Unit Rig & Equipment Company, Tulsa, Okla., a corporation of Delaware
Filed Dec. 29, 1967, Ser. No. 694,661
Int. Cl. H02k 7/114
U.S. Cl. 318—302                                7 Claims

ABSTRACT OF THE DISCLOSURE

A vehicle having one or more wheels powered by an electric motor which acts as a generator under conditions of dynamic braking and one or more wheels provided with friction brakes wherein the braking effort applied to the friction brakes is proportional to the braking effort produced by the dynamic braking.

---

This invention relates to a combination of dynamic braking and friction braking; more particularly the present invention provides a system wherein the braking effort which is applied to and exerted by the friction brakes is proportional to the braking effort produced by the dynamic braking.

The present invention can be employed with a multi-wheeled vehicle wherein one or more of the wheels is driven by one or more electrical motors; the electrical motor or motors are driven by an electrical generator which, in turn, can be driven by a diesel engine, turbine, etc. In one particular type of vehicle the main generator supplies power to the motor wherein the armature for the motor and its fields are in series; an auxiliary or exciter generator is used to provide power for the fields of the main generator. Under conditions of dynamic braking (when the operator takes his foot off the accelerator and places it on the brake) one or more switches (not shown herein) change the various connections between the main generator, the exciter generator and the motor such that the armature of the motor is no longer connected across the output of the generator but rather across one or more load resistors which will dissipate the power produced by the motor during dynamic braking. Also, some of the main generator fields supplied by the exciter generator are reversed to limit the ultimate output from the motor. The amount of dynamic braking produced is not dependent alone upon how far the brake pedal is depressed; the dynamic braking effort is also dependent upon the speed of the vehicle. The amount of dynamic braking that can be produced increases with the speed of the vehicle up to a certain limiting speed. A vehicle of the type referred to herein is also provided with friction brakes which can be actuated by pneumatic means, hydraulic-pneumatic means or by electrical means such as solenoids, etc.

When it is desired to supplement the dynamic braking with the friction brakes provided on the vehicle, it is difficult to achieve the right degree of friction braking in view of the fact that the dynamic braking effort varies with speed.

Accordingly, it is a principal object of the present invention to provide a braking system of the type referred to herein wherein the braking effort applied to and exerted by the friction brakes is proportional to the dynamic braking effort.

It is a further object of the present invention to effect a proportional braking effort on the friction brakes in response to a voltage taken off the load resistors in the circuit of the electrical motor.

It is a further object of the present invention to provide an electro-pneumatic transducer which is capable of sensing a voltage taken from the load resistor and transforming it into a proportional pneumatic signal which ultimately provides a proportional frictional braking.

Other and further objects and advantageous features of the present invention will hereinafter more fully appear in connection with a detailed description of the drawings in which.

Figure 1:
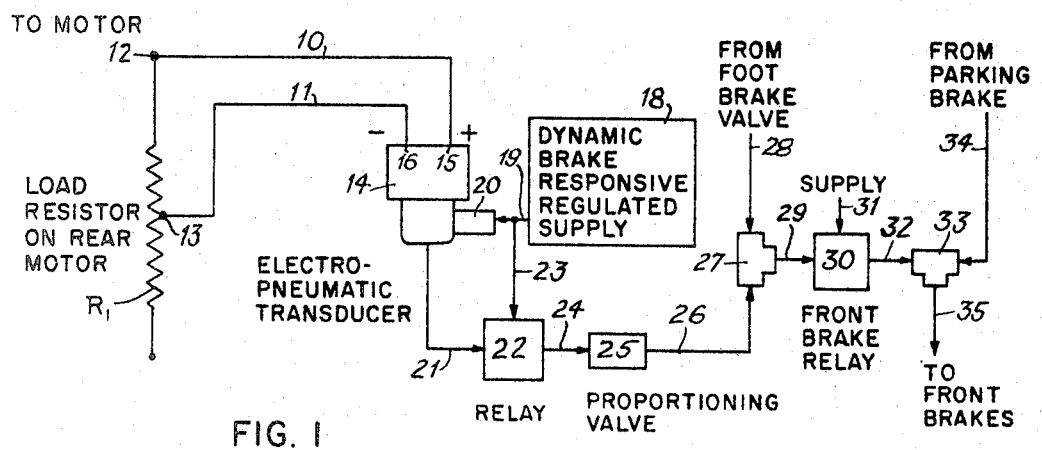
FIGURE 1 is a schematic diagram showing one form of the invention.

Referring to the drawings in detail, FIGURE 1 shows a circuit diagram wherein resistor $R_1$ represents one of the load resistors which is connected across the output of the motor (not shown) when the latter is in a condition of dynamic braking. Wires 10 and 11 connect from taps 12 and 13 on the load resistor $R_1$ to an electro-pneumatic transducer 14. The voltage sensed between the taps 12 and 13 is not the total voltage across the load resistor $R_1$ and, of course, is not the total voltage put out by the motor (now generator) under conditions of dynamic braking; rather, the voltage sensed between these two taps is a fraction of the voltage across the load resistor and is selected so as to fall within the power requirements of the electro-pneumatic transducer 14; nevertheless, the voltage drop between the taps 12 and 13 will always be proportional to the total voltage drop across the load resistor as well as that produced by the motor and, thus, will be proportional to the dynamic braking effort.

The electro-pneumatic transducer 14 can be any one of several conventional types and, hence, the details of this unit are not shown herein. Briefly stated, the transducer 14 is capable of transforming a variable electrical signal into a correspondingly variable pneumatic pressure. The variable electrical signal is introduced by the wires 10 and 11 at the terminals 15 and 16 on the transducer 14. The outlet conduit 17 from the transducer 14 will provide a pneumatic pressure which is proportional to the difference in voltage at terminals 15 and 16. A source of pneumatic pressure is provided from a regulated supply 18 which is energized or actuated only when dynamic braking occurs. A conduit 19 connects from the regulated supply 18 to a pressure control section 20 of the transducer 14. The purpose of the pressure control section 20 is to provide an input pressure for the transducer falling within certain predetermined limits. Although, as indicated above, any acceptable electro-pneumatic transducer can be employed, the present invention has actually incorporated a pneumatic pressure transducer manufactured by Fisher Governor Company as illustrated in Bulletin E-546(10M-5-65-MP) and the construction manual and parts lists Form 1783B (10M-11-66), both published by the Fisher Governor Company.

The internal construction of the electro-pneumatic transducer 14 is such, in light of the hook up described above, that the output conduit 21 from the electro-pneumatic transducer 14 is capable of producing a pressure up to 30 p.s.i. which will be proportional to the value of the voltage sensed between points 12 and 13 on the load resistor $R_1$. The signal from the conduit 21 is fed into a 3 to 1 relay 22. The relay 22 is operated from a regulated supply 18 by means of the conduit 23 which connects with the conduit 19. The output 24 of the relay 22 will provide a maximum signal of 90 p.s.i. The actual signal in the conduit 24 will be threefold the value of the signal in the conduit 21 but will, at all times, be proportional to the voltage sensed across the taps 12 and 13. The signal from the conduit 24 is passed into a proportioning valve 25. The proportioning valve shown is a fifty percent proportioning valve such that the output conduit 26 from the proportioning valve 25 will produce a maximum signal of 45 p.s.i. which is the desired operating pressure for the pneumatic brakes of the specific embodiment referred to in FIGURE 1. The conduit 26 connects with one of the inlets of a two way check valve 27. This two way check valve can also be referred to as a shuttle valve. The other of the two inlets to this two way check valve is designated as connecting with the foot brake valve through the conduit 28. The outlet 29 from the two way check valve connects with a front brake relay 30. The front brake relay is operated by a source of pneumatic pressure connecting with the supply by means of the conduit 31. The output from the front brake relay is provided by the conduit 32 which connects with another two way check valve or shuttle valve 33. The other inlet to this shuttle valve 33 connects with the parking brake valve or relay by means of the conduit 34. The outlet 35 from this valve 33 connects directly with the front brake system. In this regard, the front brake system could be pneumatic or pneumatic over hydraulic.

Assuming that there is no signal from the foot brake valve or from the parking brake, the signal coming from the conduit 35 will have a maximum value up to 45 p.s.i. and will be proportional to the voltage sensed between the taps 12 and 13 on the load resistor $R_1$. Of course, means can be provided for disabling the foot brake valve or the parking brake valve so that these two means cannot interfere with the automatic system; however, the signal from the parking brake to the conduit 34 merely insures that the front brakes will be on whenever the parking brake is engaged. Furthermore if it is desired to exert a greater pressure on the front brakes than that produced by the electro-pneumatic transducers, it merely suffices to press down on the foot brake until the pressure in the conduit 28 exceeds that in the conduit 26. The signal from the foot brake valve will then supersede that from the electro-pneumatic transducer and the signal in the conduit 35 will then depend upon how hard the foot brake is depressed.

Figure 2:
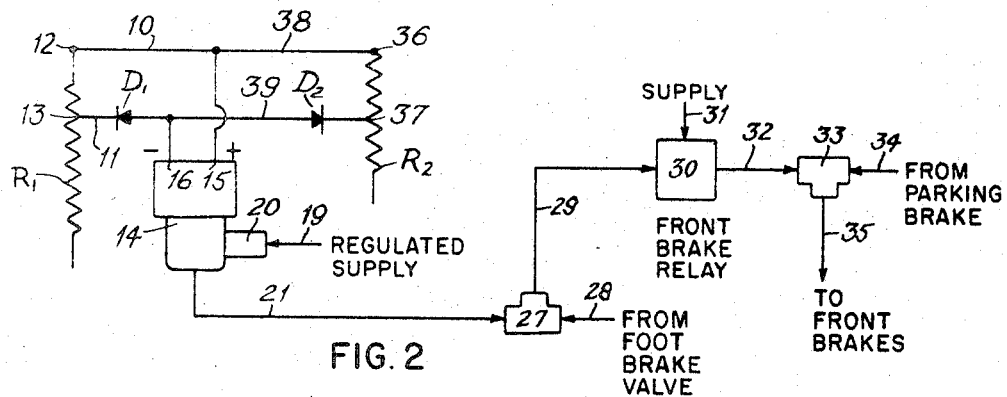
FIGURE 2 is a schematic diagram showing a modified form of the present invention.

FIGURE 2 shows a simplified pneumatic circuit but one which is capable of operating from more than one load resistor and, thus, which is capable of operating off the output of more than one motor. $R_1$ represents the load resistor on a rear motor in exactly the same manner as set forth above with respect to FIGURE 1. However, $R_2$ represents a similar load resistor on another rear motor. The connections between the electro-pneumatic transducer 14 and the load resistor $R_1$ are the same as in FIGURE 1 except that a diode (or rectifier) $D_1$ is located in the line 11 leading from the tap 16 on the electro-pneumatic transducer to the tap 13 on the resistor $R_1$. The load resistor $R_2$ on the other rear motor (not shown) is connected to the electro-pneumatic transducer 14 in a similar manner; thus, the resistor $R_2$ has taps 36 and 37 which represent substantially the same value of voltage to be measured as between the taps 12 and 13. Tap 36 is connected to the tap 15 on the electro-pneumatic transducer 14 by means of the lead wire 38. Likewise the tap 37 is connected to the tap 16 on the electro-pneumatic transducer 14 by means of the lead line 39. However, a diode $D_2$ is interposed in the line 39 in exactly the same manner that the diode $D_1$ is interposed in the line 11. The arrangement between the resistors $R_1$ and $R_2$ utilizing the diodes $D_1$ and $D_2$ is such that the greater voltage sensed between either taps 12 and 13 or taps 36 and 37 will be the operating voltage impressed across the terminals 15 and 16 of the electro-pneumatic transducer 14. With this arrangement, if one of the rear wheels should skid and thus cease to rotate, the voltage generated by the associated motor would be essentially zero; in such a case the motor from the other wheel would provide the correct operating voltage for the electro-pneumatic transducer.

Continuing with FIGURE 2, the electro-pneumatic transducer is connected to a regulated supply by means of the conduit 19 which feeds into the pressure control section 20 in the same manner as described in relation to FIGURE 1. The output 21 from the transducer 14 will provide a maximum signal of 30 p.s.i. as before which will be proportional to the value of the larger voltage sensed across $R_1$ or $R_2$. For the purpose of showing a somewhat different and simplified arrangement, however, the output 21 is fed directly into the two-way check valve 27 which also connects with the foot brake valve by means of the conduit 28. The output from the two way check valve 27 connects with the front brake relay 30 by means of the conduit 29. The front brake relay connects with the check valve 33 and the front brakes in exactly the same manner described above with respect to FIGURE 1. Thus it would appear that the relay 22 and proportioning valve 25 have been eliminated from the FIGURE 2 circuit. The output from the conduit 35 as provided by the electro-pneumatic transducer 14 will thus have a maximum pressure of 30 p.s.i. which will be proportional to the greater of the two voltages sensed across the resistors $R_1$ or $R_2$.

Figure 3:
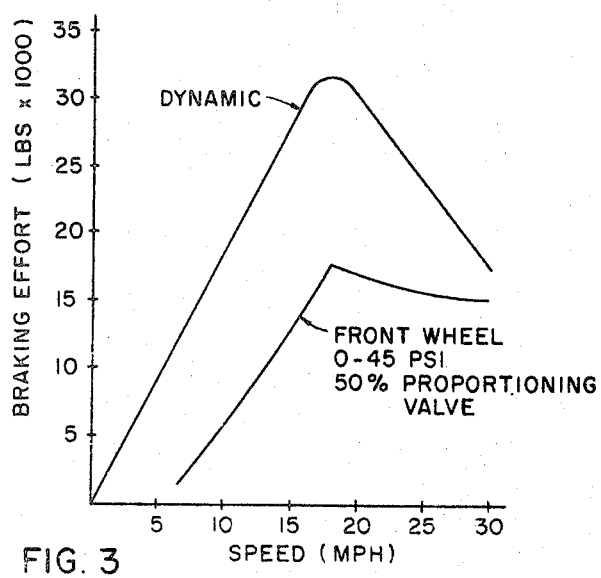
FIGURE 3 is a graph which compares dynamic braking effort with the braking effort which is applied to the friction brakes in accordance with the present invention.

FIGURE 3 is a comparison of the braking effort produced by the dynamic braking and that exerted on the front wheels. The particular curve for the front wheels is that produced by the circuit of FIGURE 1. Thus the front wheel braking effort rises and reaches its peak at the same speed as the dynamic braking curve; similarly as the dynamic braking effort falls off above this peak point, the front wheel braking pressure falls also. By using different combinations of relays and proportioning valves it is possible to produce a maximum output pneumatic pressure of almost any desired value consistent with the requirements of a particular braking system. For example, using a 1 to 1 relay and a fifty percent proportioning valve the maximum output control pressure will be 15 p.s.i.; using a 3 to 1 amplifier alone, the output pressure will be a maximum of 90 p.s.i. As indicated heretofore, it may be desirable to provide a front brake cut out switch so that supplemental front braking can be bypassed if desired.

Whereas the present invention has been described in particular relation to the drawings attached hereto, it should be understood that other and further modifications apart from those shown or suggested herein may be made within the spirit and scope of this invention.

For example, the above description refers to electric motors on the "rear" wheels and friction brakes on the "front" wheels; obviously this arrangement could be reversed, if desired. Thus, the words "rear" and "front" are used in an illustrative, and not limiting sense.

Also, although the dynamic braking system described herein has been set forth in relation to motors whose energies are dissipated through load resistors and the like, it should be understood that this invention applies to dynamic braking broadly. The energy from the motor (when it is acting as a generator under conditions of dynamic braking) could be fed back into the source as is presently done in some trolley systems embodying a plurality of vehicles. In the latter case the transducer, depending upon its size and design, would merely be connected across all or a portion of the output of the motor.

What is claimed is:

1. In a wheeled vehicle having at least one wheel powered by an electric motor which acts as a generator under conditions of dynamic braking, said vehicle having at least one other wheel provided with friction brakes which are operated by a pneumatic means, the improvement which comprises an electro-pneumatic transducer capable of producing a variable output pneumatic pressure proportional to a variable electrical input, means connecting the electrical input of said electro-pneumatic transducer across at least a portion of the output of said motor whereby the input to said electro-pneumatic transducer will sense at least a portion of the voltage produced by said electric motor under conditions of dynamic braking, and means connecting the output of said electro-pneumatic transducer to said pneumatic means for operating said friction brakes.

2. The invention as set forth in claim 1 wherein said electric motor will dissipate its load across at least one load resistor under conditions of dynamic braking and wherein said means connecting the electrical input of said electro-pneumatic transducer across at least a portion of the output of said motor includes means connecting said electro-pneumatic transducer across a portion of said load resistor.

3. The invention set forth in claim 1 wherein said vehicle has an additional wheel powered by a second electric motor which acts as a generator under conditions of dynamic braking, means connecting the electrical input of said electro-pneumatic transducer across at least a portion of the output of said second motor whereby the input to said electro-pneumatic transducer will sense at least a portion of the voltage produced by said second electric motor under conditions of dynamic braking, the means connecting the input of said electro-pneumatic transducer to said two motors being provided with diode means to isolate the circuits from each other whereby the voltage sensed by the input to said electro-pneumatic transducer is the larger of the two voltages produced by the two motors.

4. The invention as set forth in claim 3 wherein said motors will dissipate their loads across first and second load resistors, respectively, and wherein the means connecting the electrical input of said electro-pneumatic transducer to the outputs of said motors comprise means connecting said electrical input across portions of said first and second resistors, respectively, through said diode means.

5. The invention as set forth in claim 1 including means for amplifying the output of said electro-pneumatic transducer before applying said output to said pneumatic means for said friction brakes.

6. The invention as set forth in claim 5 including means for proportionally diminishing the amplified output from said electro-pneumatic transducer before applying this amplified output to said pneumatic means for said friction brakes.

7. The invention as set forth in claim 1 including means for overcoming the output of said electro-pneumatic transducer whereby said pneumatic means can be actuated manually and independently of the dynamic braking effort to cause engagement of said friction brakes.

References Cited

UNITED STATES PATENTS

| | | | |
|---|---|---|---|
| 712,650 | 11/1902 | Case | 188—159 |
| 1,833,443 | 11/1931 | Spangler | 188—159 |
| 1,939,866 | 12/1933 | Thomas | 188—159 |
| 2,137,019 | 11/1938 | Logan | 188—159 |
| 2,246,127 | 6/1941 | Davis | 188—159 |
| 2,933,350 | 4/1960 | Hines | 188—159 |

ORIS L. RADER, Primary Examiner

K. L. CROSSON, Assistant Examiner

U.S. Cl. X.R.

188—159; 318—17, 371